United States Patent [19]

Folwell et al.

[11] Patent Number: 4,785,429
[45] Date of Patent: Nov. 15, 1988

[54] RANGE CONTROL SYSTEM

[76] Inventors: Dale E. Folwell, 1113 Wingfoot St., Placentia, Calif. 92670; William A. Koepsell, 16740 Greenwich Cir., Yorba Linda, Calif. 92686

[21] Appl. No.: 21,780

[22] Filed: Mar. 4, 1987

[51] Int. Cl.[4] .............................................. G01S 9/66
[52] U.S. Cl. ..................................... 367/98; 367/900; 367/909; 367/99
[58] Field of Search ................... 367/111, 112, 99, 98, 367/105, 909, 900

[56] References Cited

U.S. PATENT DOCUMENTS

| 4,197,528 | 4/1980 | Gibson | 367/98 |
|---|---|---|---|
| 4,247,924 | 1/1981 | Baird | 367/111 |
| 4,326,273 | 4/1982 | Vancha | 367/112 |
| 4,464,738 | 8/1984 | Czajkowski | 367/112 |
| 4,467,313 | 8/1984 | Yoshimo et al. | 367/111 |

Primary Examiner—Thomas H. Tarcza
Assistant Examiner—Daniel T. Pihulic
Attorney, Agent, or Firm—James F. Kirk

[57] ABSTRACT

A range control system positioned within a stationary housing comprising: a pulse oscillator for providing a clock signal; and a transmitter receiver circuit that directionally transmits an acoustic pulse signal to a target and receives an echo from the target to provide an amplified echo signal. A timing circuit means is included for providing a range gate signal characterized to start with each clock signal and to have a predetermined duration characterized to provide a time for the acoustic pulse to travel to the target and for the echo to return from the target. An alarm signal is provided to indicate that an echo signal is being received prior to the termination of the range gate signal. A ring blanking gate signal source provides a ring blanking gate signal commencing with each clock signal and having a duration longer than the tailoff ringing of the acoustic pulse. A diode clamp is coupled to the transducer drive circuit echo signal output. A diode bias circuit provides a predetermined time dependent uni-polar decreasing bias current to the diode clamp first terminal to bias the diode clamp to provide diminishing attenuation of the electrical echo signal with increasing time.

14 Claims, 8 Drawing Sheets

RANGE CONTROL SYSTEM

FIELD OF THE INVENTION

The invention relates to the field of sensing devices, systems and circuits for providing the operator or controller of a vehicle that is approaching an obstruction with a visual or audible signal to indicate when the vehicle is within a predetermined range of the obstruction.

1. Background of the Invention

This invention provides a low cost answer to the problem of signaling an operator or the controller of a vehicle with a first signal characterized to advise the operator that the vehicle he is operating has been detected by and is within the outer limits of the predetermined surveillance perimeter of the invention system. The first signal to the operator indicates that the vehicle has crossed the outer threshold of the predetermined range band measured with respect to the location of a reference signal source. As the vehicle moves closer to the invention range control system, a second signal is provided to the operator to advise the operator or controller that the vehicle is passing a predetermined inner range threshold measured from the reference location. The signals provided are specifically intended to provide the operator of a vehicle when to stop the vehicle as it is being maneuvered into a proper parking situation.

2. Prior Art

A common problem associated with parking a car in the household garage is stopping the car at the ideal location. Usually, the car is too close to the bench or laundry area as to prevent easy passage. Or, the car is not fully in the garage preventing the garage door from closing. Elementary prior art systems include physical physical arrangement of markings on floor and wall surfaces, to indicate when the vehicle has been properly positioned. These marks are observed by an operator as the vehicle is positioned in a garage or other parking location. The operator is required to exercise judgement in compensating for parallax and other factors. The accuracy of a system dependent on physical limit markings is dependent on the operators training and other factors such as lighting and the illumination of the markings.

Light beams operating with a sensitive electric eye have been used to indicate when a person or other object has crossed a predetermined path. Devices using light beams and transmitting source of light and a receiver be coaxially aligned for operation. Movement of the system requires a realignment of the system components with each move. Systems of this character monitor a line of sight region. Two sets of hardware, i.e. a transmitter and a receiver mounted at opposing ends of the monitored line along with the wiring associated with coupling signals and power to them for their use, are required.

Door openers are in common use to provide a signal as an individual enters a monitored area. These units typically have limited range, a non-focused beam and no provision for providing a first signal to indicate that the monitored region has been entered and a second signal to indicate that the target has crossed a predetermined range threshold.

Intrusion Detector Systems sometimes use ultrasonic sound waves to detect the presence of a target. The present invention differs from intrusion detection apparatus...

SUMMARY OF INVENTION

A first objective of the invention RANGE CONTROL SYSTEM is to provide a low cost position RANGE CONTROL SYSTEM. This RANGE CONTROL SYSTEM would continuously monitor a limited physical area and detect an object entering the monitored area. Once an object was detected, the system would provide a visual, audio or electrical output to the user to indicate that the system was functioning and that the system had locked on to the user target.

In assisting a user to park an automobile, the ultrasonic RANGE CONTROL SYSTEM is placed on the wall of the garage at about eye level with the driver. There are two lights on the RANGE CONTROL SYSTEM to indicate the cars position in the garage. Initially, both lights are off. As the car enters the monitored area, the green light turns on indicating the unit is operational and the car has been detected. As the car continues to enter the garage, the green light will remain on until the car reaches a predetermined distance from the sensor. At that point the sensor turns the green light off and turns the red light on.

In a first embodiment, the sensor comprises a transmitter receiver housing mounted at a reference the voltage source and positioned within the transmitter housing for directing transmitting a pulse signal to the target, for receiving an echo from the target, and for providing an ALARM SIGNAL to indicate that the echo signal has returned within a within a time less than a predetermined RANGE GATE SIGNAL. The sensor also has an output signal means responsive to the ALARM SIGNAL for providing an OUTPUT ALARM SIGNAL to indicate that the target is at a position within a predetermined range of the housing.

In a more particular embodiment, the sensor transmitter receiver circuit means also has circuit means for providing an IN RANGE SIGNAL to indicate that an echo signal has been received from a target ; and an output signal means responsive to the IN RANGE SIGNAL to indicate a target is within the detection range of the transmitter receiver circuit means. In another alternative embodiment, the transmitter receiver circuit means also has logic circuit means responsive to the ALARM SIGNAL for interrupting the IN RANGE SIGNAL.

PREFERRED EMBODIMENT

Figure 4:
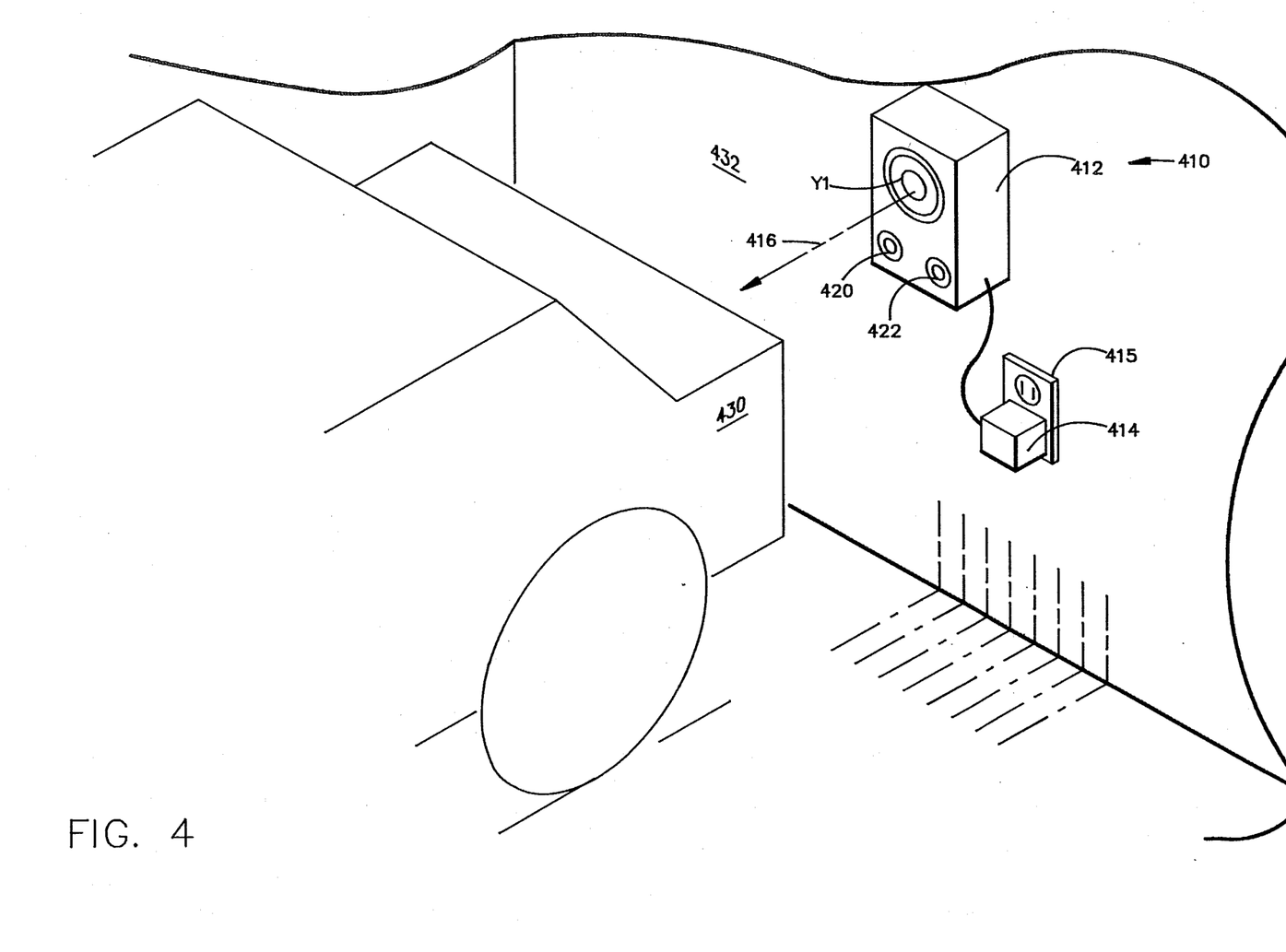
FIG. 4 is a perspective view of an assembly and accompanying power source mounted on a wall for the purpose of providing a range signal to the operator of an approaching vehicle.
Figure 5:
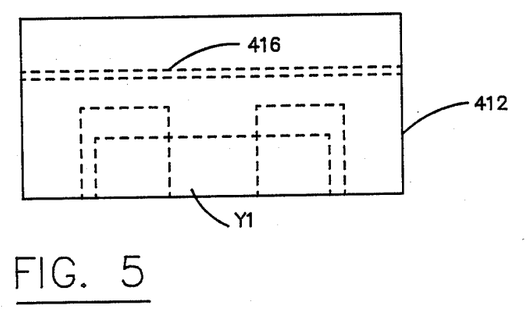
FIG. 5 is a top elevation view of the assembly.
Figure 6:
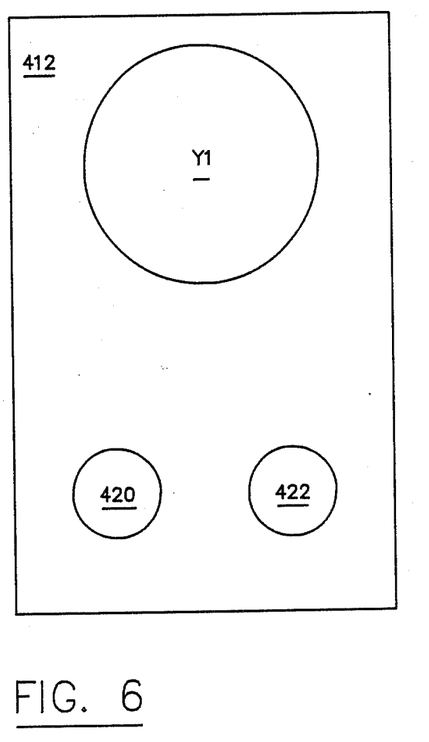
FIG. 6 is a front elevation drawing of the assembly.
Figure 7:
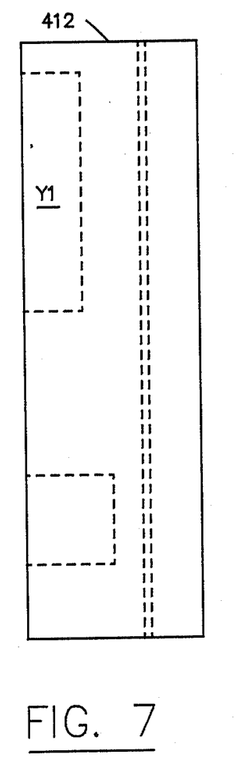
FIG. 7 is a side elevation of the assembly.

FIG. 4 shows a the invention RANGE CONTROL SYSTEM 410 powered from a VOLTAGE SOURCE 414 such as the wall mounted 9.0 dc voltage sources commonly associated with battery chargers for small appliances. VOLTAGE SOURCE 414 is shown inserted into a typical 115 Vac, 60 Hz wall outlet 415. The RANGE CONTROL SYSTEM 410 provides a signal by means of a green and red lamp 420, 422 to indicate the distance of an approaching target such as vehicle 430, from the location of a stationary transmitter receiver positioned within a transmitter receiver housing 412 mounted at a reference position such as on the wall of a garage 432. The invention RANGE CONTROL SYSTEM 410 determines the distance between the vehicle 430 and the housing 412 by measuring the time between the transmission of an acoustic pulse characterized by wave 416 and its echo return off of the vehicle.

In this application, the ultrasonic sensor is placed on the wall of the garage at about eye level with the driver. Initially, both lights are off. As the car enters the monitored area, the green light turns on indicating the unit is operational and the car has been detected. As the car continues to enter the garage, the green light will remain on until the car reaches a pre-set distance from the sensor. At that time, the green light will turn off and a red light will turn on.

Present perimeter security systems usually use a light beam as the sensor medium. Most generally this requires a separate receiver or an additional mirror on the opposite wall to reflect the transmitted beam back to the receiver/transmitter.

For a security application, the RANGE CONTROL SYSTEM is adjusted to detect any object closer than the predetermined range. Any object outside this range would be ignored. As the sensor detects sound waves reflected from the object, there is no need for the secondary mirror or remote receiver. In the security application, the RANGE CONTROL SYSTEM output would be in the form of a audio alarm or an electrical signal to a remote device.

Figure 1:
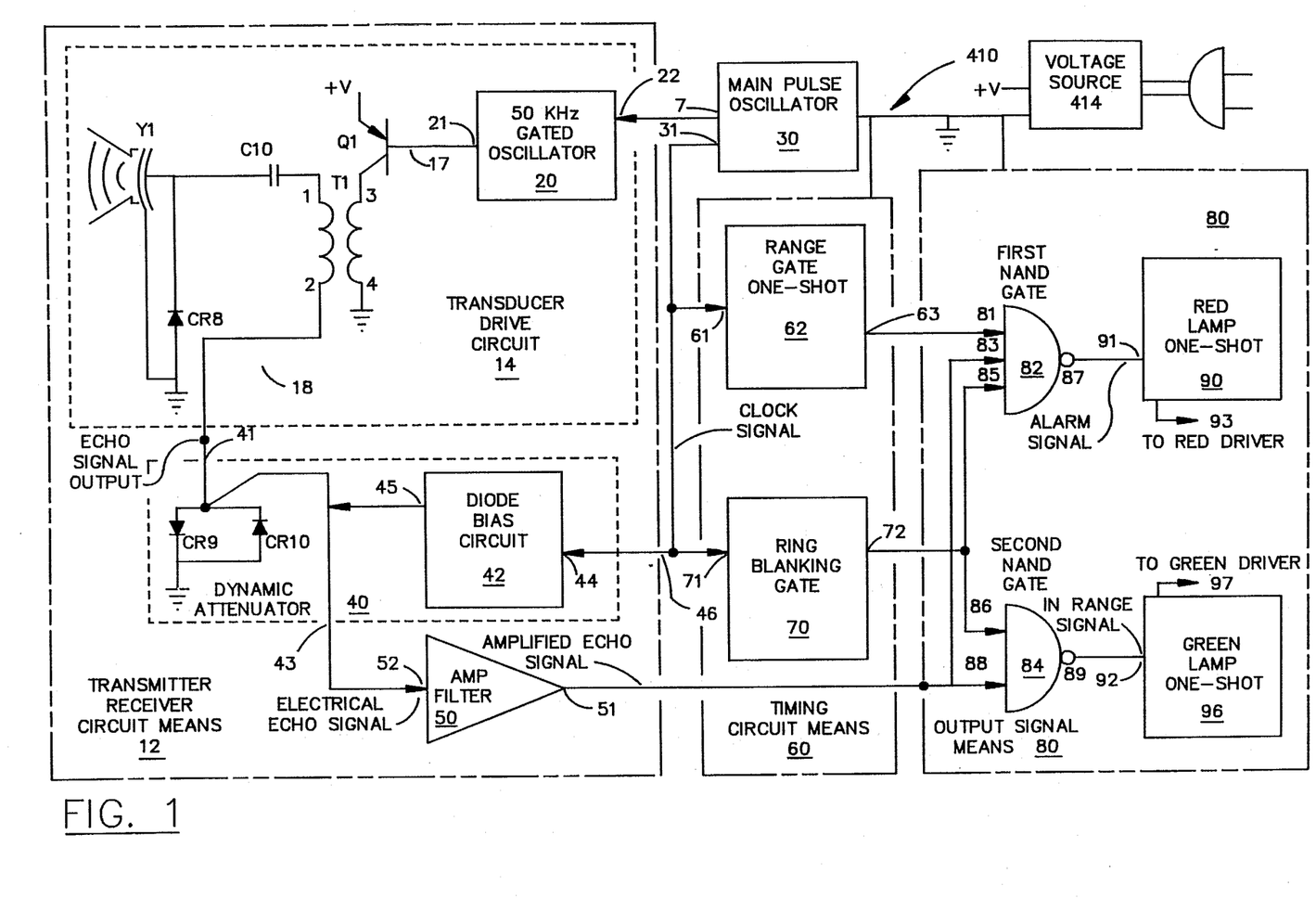
FIG. 1 is a block diagram of the invention system.

FIG. 1 shows a particular embodiment of the circuit of the invention RANGE CONTROL SYSTEM 410. Phantom block 12 represents a transmitter receiver circuit means powered by the voltage source +V and positioned within the transmitter receiver housing 412 (not shown) for directionally transmitting an acoustic pulse signal to the target, for receiving an echo from the target, and for providing an ALARM SIGNAL by lighting a RED LAMP to indicate that the echo signal has returned within a within a time less than a predetermined RANGE GATE SIGNAL, to be discussed in connection with the timing diagrams of FIGS. 2a and 2b.

Block 30 represents a MAIN PULSE OSCILLATOR for providing a clock signal also to be discussed in connection with FIGS. 2a and 2b.

Phantom block 12 represents a TRANSMITTER RECEIVER CIRCUIT MEANS responsive to the clock signal from the MAIN PULSE OSCILLATOR 30 for directionally transmitting an acoustic pulse signal to the target, for receiving an echo from the target, and for providing an amplified echo signal from the output of AMPLIFIER FILTER 50.

Phantom block 60 represents a TIMING CIRCUIT MEANS responsive to the clock signal for providing a range gate signal characterized to start with each clock signal and to have a predetermined duration characterized to provide a time for the acoustic pulse to travel to said target and for said echo to return from the target. The duration of the range gate signal is adjustable by the operator to enable the operator to control the distance at which the ALARM SIGNAL is provided.

Phantom block 80 represents an OUTPUT SIGNAL MEANS means responsive to the range gate signal and to said amplified echo signal for providing an ALARM SIGNAL to indicate that an echo signal is received prior to the termination of said range gate signal.

The ALARM SIGNAL is provided from RED LAMP ONE-SHOT output 93 to indicate that a target is at a position within a predetermined range of the housing.

The OUTPUT SIGNAL MEANS 80 also provides an IN RANGE SIGNAL from GREEN LAMP ONE-SHOT output 97 to indicate that an echo signal has been received from a target.

The TIMING CIRCUIT MEANS 60 of FIG. 1 further comprises RING BLANKING GATE signal source represented by block 70. The acoustic pulses transmitted by the transducer Y1 within the TRANSDUCER DRIVE CIRCUIT 14 provides a very short pulse. Each pulse ends with an undesirable damped ringing period. The RING BLANKING GATE signal source 70 is responsive to the clock signal for providing a ring blanking gate signal commencing with each clock signal and having a duration longer than the tailoff of said acoustic pulse. The RING BLANKING GATE SIGNAL is depicted as waveform (d) in FIGS. 2a and 2b where the duration of the negative pulse interval is shown to typically extend 0.6 ms beyond the termination of the 50 Khz GATED OSCILLATOR drive signal waveform (b).

Figure 2A:
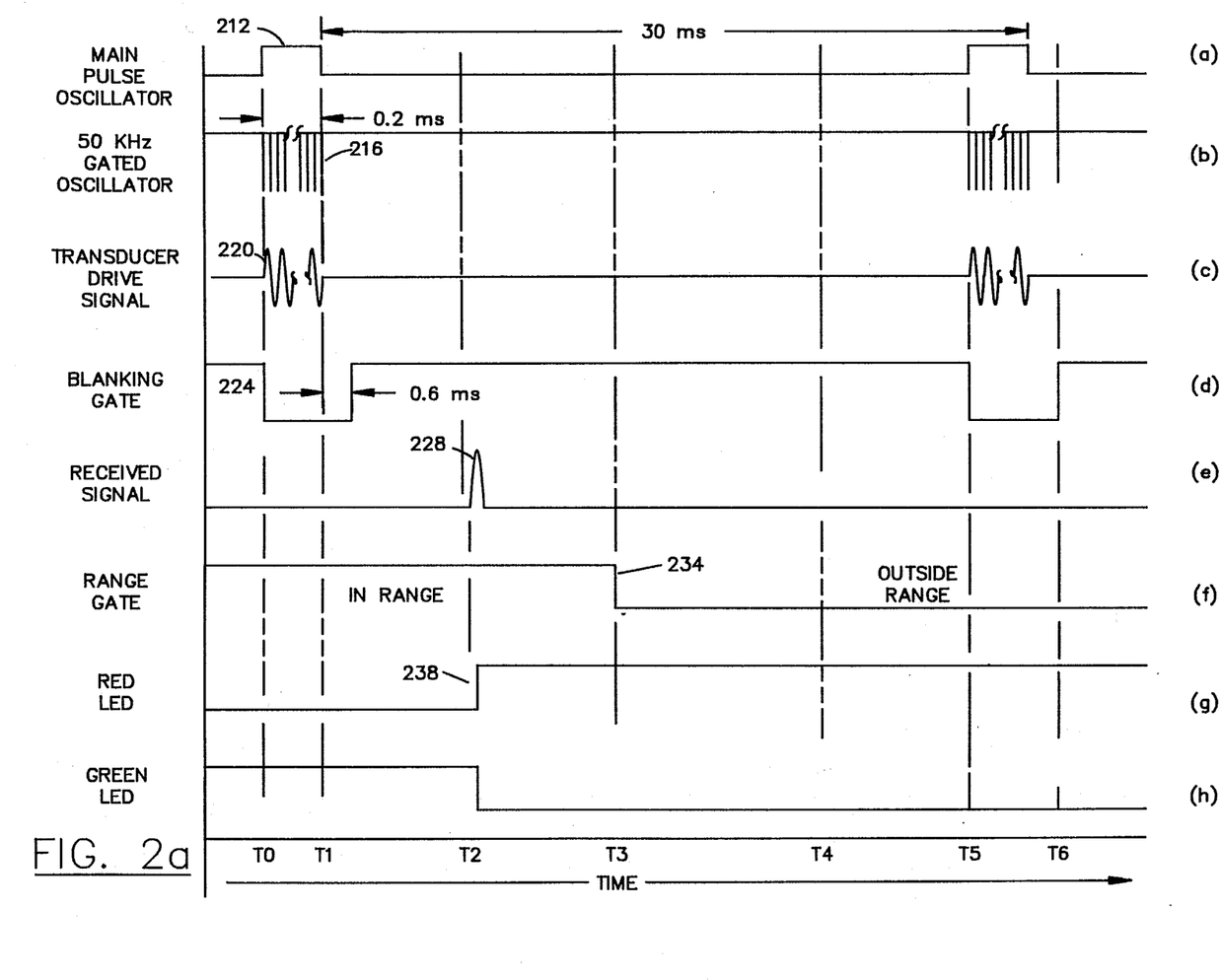
FIGS. 2a and 2b are timing diagrams for the invention system.
Figure 2B:
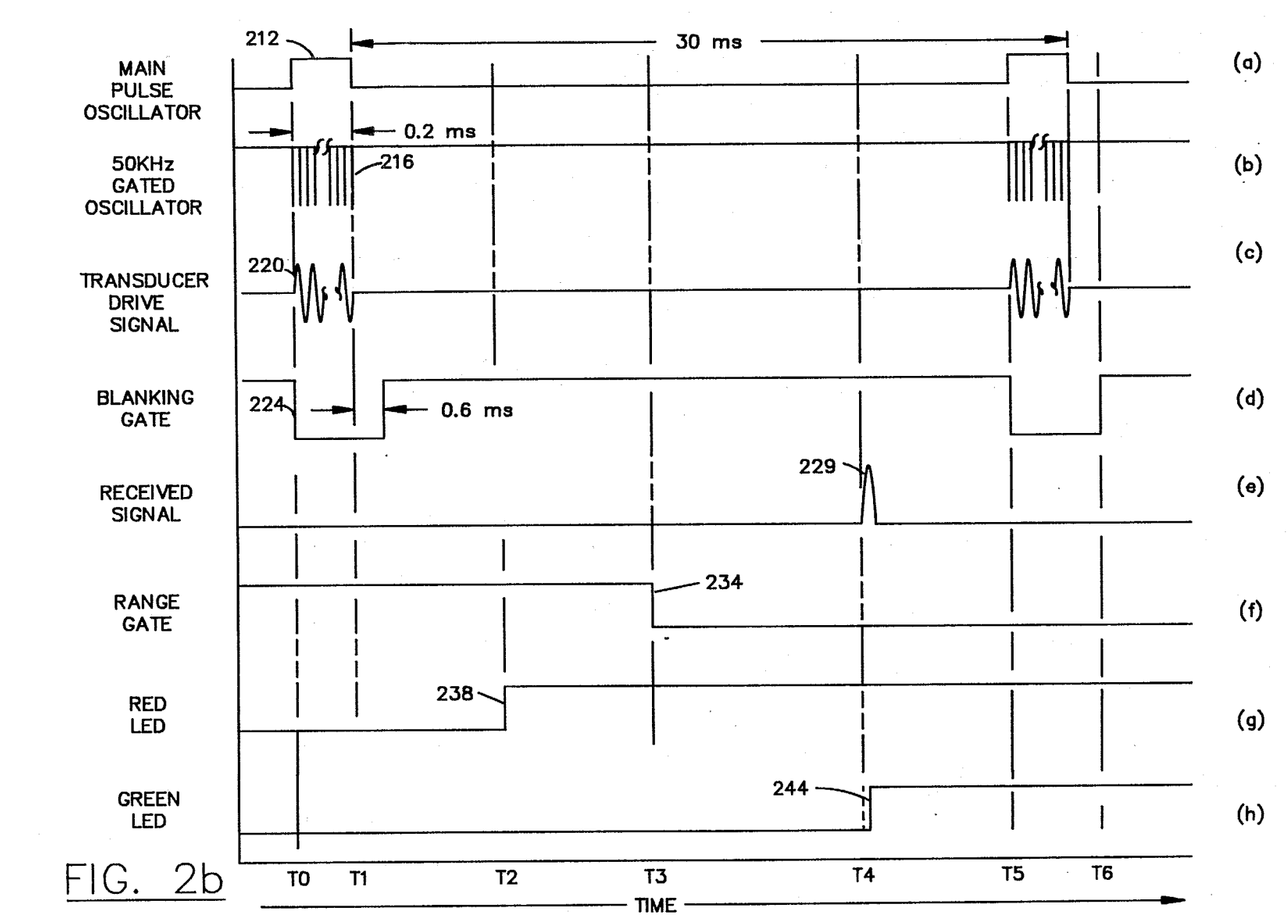

Referring to FIG. 1, the TRANSMITTER RECEIVER CIRCUIT MEANS 12 has a TRANSDUCER DRIVE CIRCUIT 14 responsive to the clock signal at its clock signal input 22 from the MAIN PULSE OSCILLATOR output 7 for providing a predetermined number of drive pulses (such as those shown as waveform (b) in FIGS. 2a and 2b. The transducer Y1 responds to each drive signal clock signal provided to input 22 and for providing an electrical echo signals at an echo signal output 41 in response to each acoustic pulse transmission. An AMP FILTER CIRCUIT 50 is coupled to said TRANSDUCER DRIVE CIRCUIT echo signal output 41 for amplifying electrical echo signals (not shown). The AMP FILTER 50 provides amplified echo signals at its output 51 in response to the electrical echo signal at AMP FILTER INPUT 52.

The TRANSMITTER RECEIVER CIRCUIT MEANS 12 also has a DYNAMIC ATTENUATOR CIRCUIT coupled to the TRANSDUCER DRIVE CIRCUIT characterized within phantom block 40. The TRANSDUCER DRIVE CIRCUIT IS responsive to the clock signal for providing predetermined decreasing attenuation to the electrical echo signals with increasing time subsequent to the clock signal.

The DYNAMIC ATTENUATOR CIRCUIT 40 also has a DIODE CLAMP formed by CR9 and CR10. The DIODE CLAMP has a first terminal coupled to ECHO SIGNAL OUTPUT 41 and a second terminal coupled to a reference potential, such as ground. Each diode has an anode and a cathode. The first diode CR9 anode is connected to the second diode CR10 cathode and to the echo signal output terminal 41. The said first diode cathode is coupled to the second diode anode and to the reference potential, i.e. ground.

The DYNAMIC ATTENUATOR CIRCUIT 40 also has a DIODE BIAS CIRCUIT responsive to said lock signal for providing a predetermined time dependent unipolar decreasing bias current to the DIODE CLAMP first terminal 41 to bias the diode clamp to provide diminishing attenuation of the electrical echo signal with increasing time.

Figure 3A:
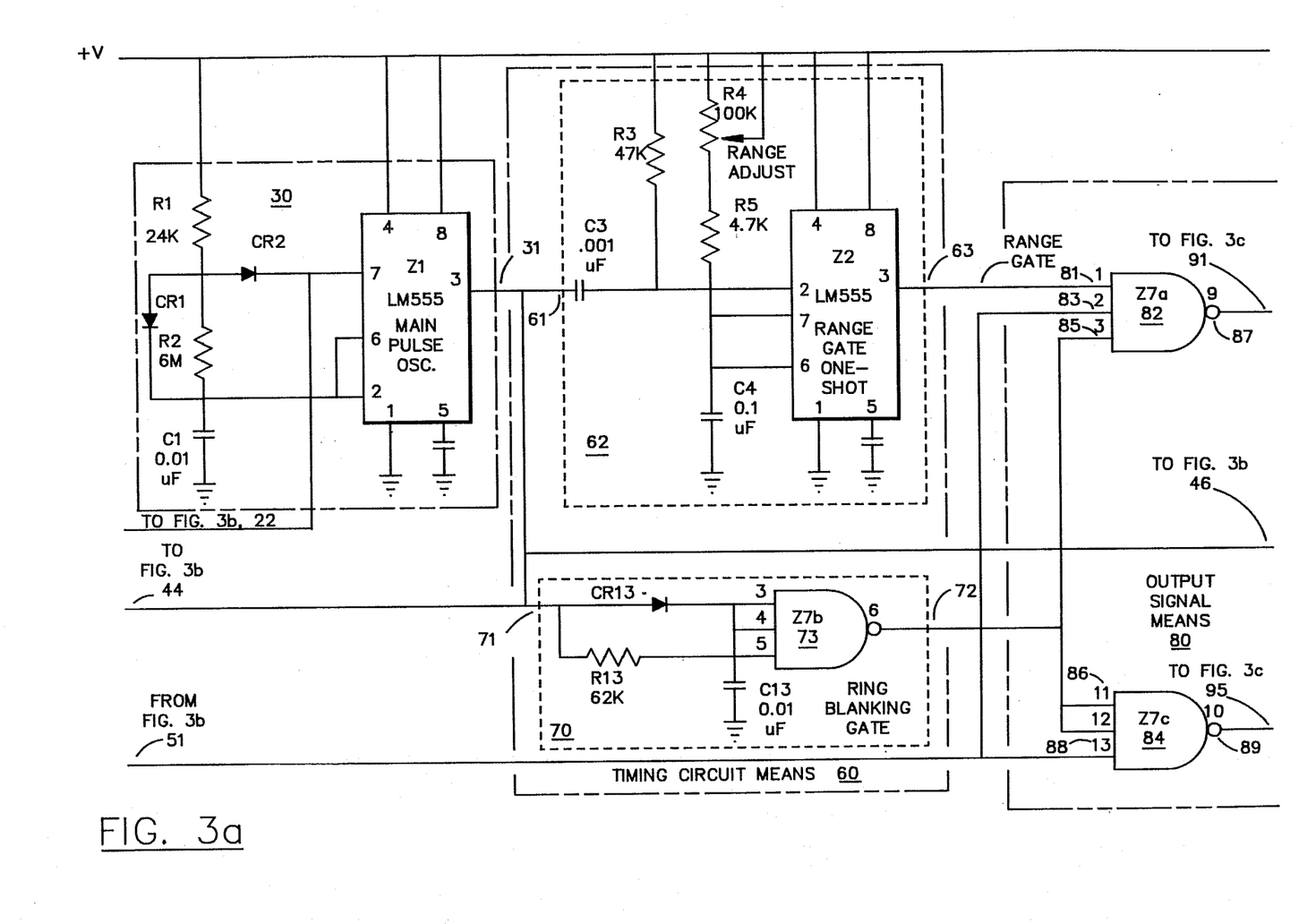
FIGS. 3a, 3b and 3c are a schematic of the invention system.
Figure 3B:
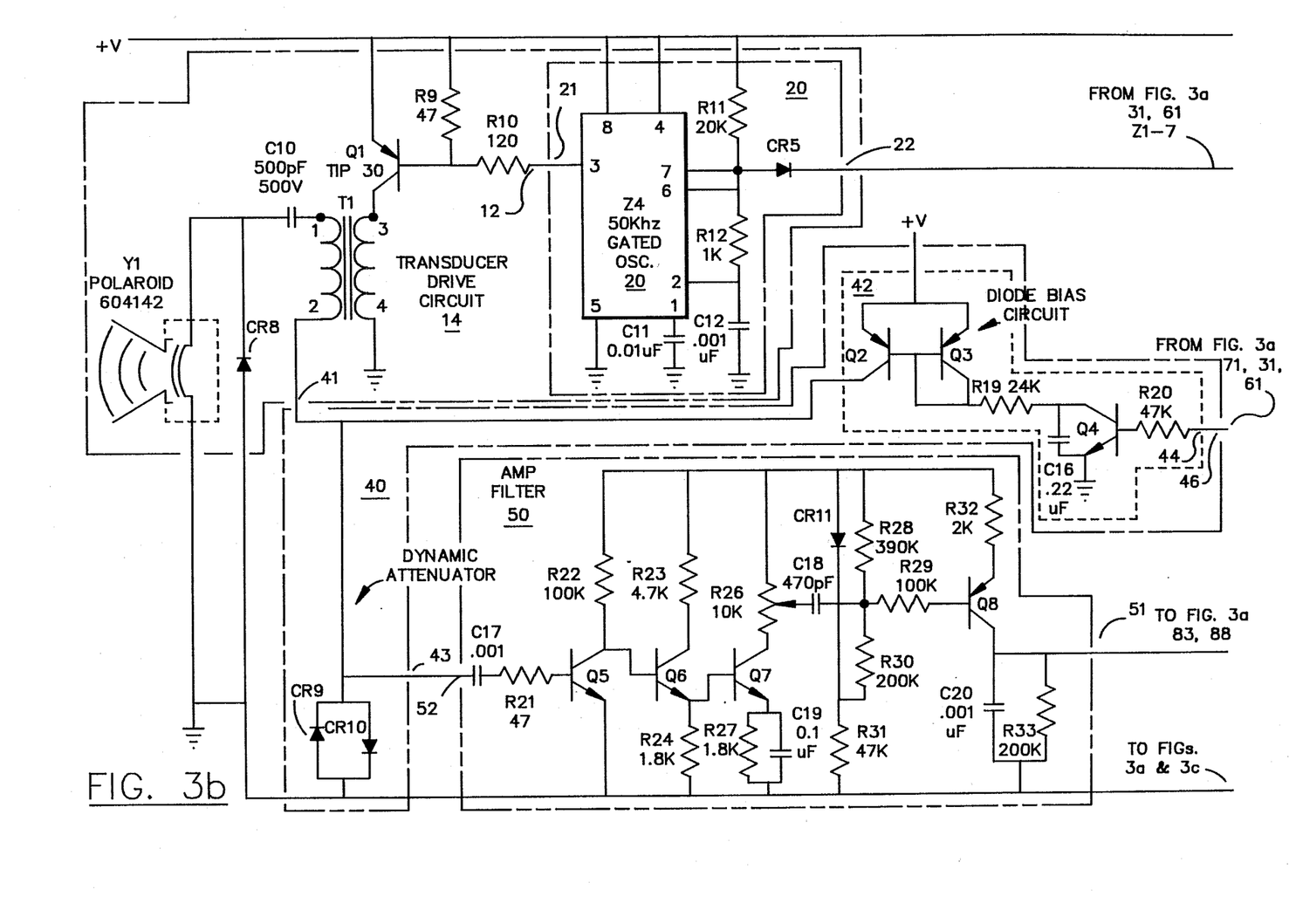

The DIODE BIAS CIRCUIT 42 is depicted in detail in FIG. 3b within phantom block 42. The DIODE BIAS CIRCUIT is shown to have a resistor R19, and a capacitor C16, each having a first and second terminal; a first and second PNP transistor Q2 and Q3 respectively, each having a collector, a base and an emitter; and a switching means such as the switching circuit of Q4 having a conduction channel having a first and second terminal such as its collector and emitter. The switching means of Q4 is responsive to the clock signal for driving the conduction channel from a non-conductive state into a conductive state.

The first and second PNP transistor emitters are coupled to the voltage source +V. The first and second PNP transistor bases are connected to each other and to the collector of the second PNP transistor Q3 and to the resistor R19 first terminal.

The capacitor C16 first terminal is coupled to the resistor R19 second terminal and to the switching means Q4 conduction channel first terminal. The capacitor C16 second terminal is coupled to the switching means conduction channel second terminal and to the reference potential, ground. The first PNP transistor Q2 collector is coupled to the DIODE CLAMP FIRST TERMINAL 41. The first and second PNP transistors form a current mirror having first and second output currents from first and second collectors. The first mirror current from the Q2 collector, i.e. the first collector biases the DIODE CLAMP. The second mirror current has a maximum value immediately after the turn off of the switching means, i.e. immediately after the clock signal. The second mirror current is exponentially limited by the rising voltage on the capacitor as current passes thru the resistor to charge said capacitor.

The OUTPUT SIGNAL MEANS 80 of FIG. 1 has a FIRST NAND GATE 82 has at least a first, second and third outputs, 81, 83 and 85 coupled respectively to the range gate signal from from AMP FILTER OUTPUT 51 and to the ring blanking gate signal from RING BLANKING GATE OUTPUT 72 for providing the ALARM SIGNAL to indicate that an echo signal is received prior to the termination of the range gate signal.

The OUTPUT SIGNAL MEANS 80 of FIG. 1 also has a SECOND NAND GATE 84 having at least a first and second inputs 86, 88 coupled respectively to the amplified echo signal from the AMP FILTER OUTPUT 50 and to the ring blanking gate signal from the RING BLANKING GATE OUTPUT 72 for providing an in range signal AT SECOND NAND GATE OUTPUT 89 to indicate that an echo signal is received subsequent to the termination of the range gate signal as shown in FIG. 2b.

Figure 3C:
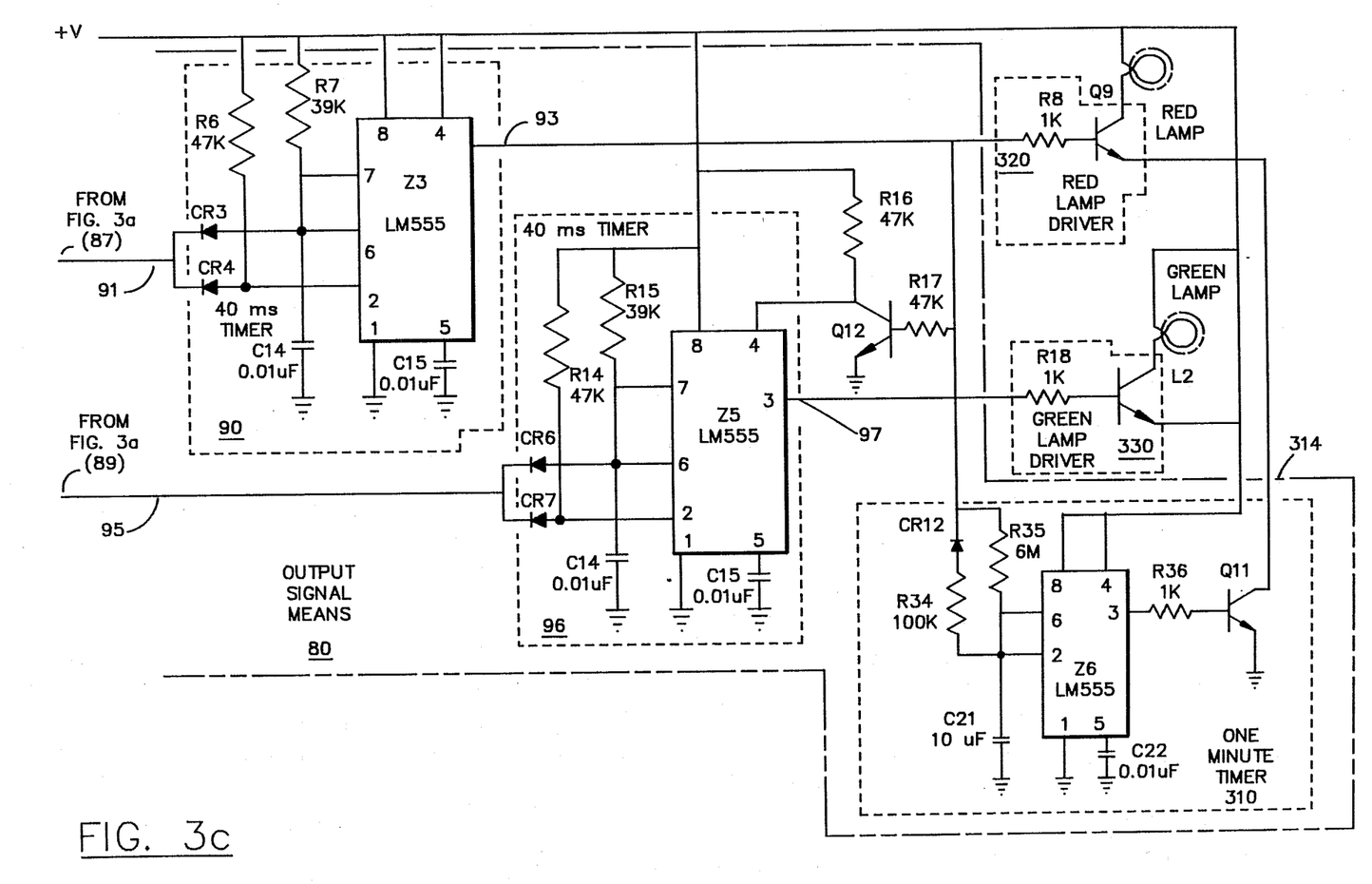

Referring to FIG. 3c, the OUTPUT SIGNAL MEANS 80 also has a TIME OUT CIRCUIT MEANS such as the circuitry of Q12 and the ONE MINUTE TIMER 310 coupled to receive the alarm signal at a reset input 312. The TIME OUT CIRCUIT MEANS 310 has a first logic state output signal at TIME OUT CIRCUIT OUTPUT 314 in response to the absence of the ALARM SIGNAL at 93 coupled to the reset input 312 and has a second logic state output at TIME OUT CIRCUIT OUTPUT 314 after a predetermined delay interval of typically one minute in response to the presence of the ALARM SIGNAL at the reset input.

Referring to FIG. 3c, phantom blocks 320, 330 represent RED LAMP DRIVER MEANS and GREEN LAMP DRIVER MEANS respectively. The RED LAMP DRIVER MEANS lights a first lamp having a first color in response to the ALARM SIGNAL to indicate that an echo signal is received prior to the termination of the range gate signal.

The GREEN LAMP DRIVER MEANS lights a second lamp having a second color in response to the IN RANGE SIGNAL to indicate that an echo signal is received subsequent to the termination of said range gate signal.

CIRCUIT DESCRIPTION

Referring to FIGS. 3a, 3b and 3c, the timing and display control for the PREFERRED EMBODIMENT of the invention system is implimented with six industry standard 555 timer integrated circuits, Z1-Z6. Functional variations required for each circuit are implimented by the use of the external components surrounding each 555 timer.

As the 555 timer is considered an industry standard, the detailed internal operation of the 555 will not be described. A description of the 555 can be found in numerous catalogs and application notes or other literature. One such book is 555 Timer Applications Sourcebook, with Street, Indianapolis, Indiana 46268. Another source is "Signetics Analog Application Manual" published by Signetics 811 E. Arques Ave. Sunnyvale, CA 94086. Referring to FIG. 3a, the MAIN PULSE OSCILLATOR 30 uses 555 timer Z1. This timer circuit is implemented as a free running multivibrator. The output of the main pulse oscillator, as shown in FIGS. 2a and 2b is a single 240 microsecond positive pulse occurring each 38 millisecond interval. The method for selecting these particular time intervals is as follows:

Diode CR1 bypasses R2, the 6 meg resistor during a charge cycle of capacitor C1. Use of the bypass diode allows independent control of the charge and discharge cycle of capacitor C1. The charge time for C1 is established by the product of the values of R1 and C1. The charge time establishes the positive pulse duration from the pin 3 output of Z1.

The discharge time of C1 is determined by the product of the values of R1 and C1 which in turn sets the negative portion of the signal level from Pin 3 output of Z1.

The Z1-7 pin provides a discharge transistor output. This output has two functions. First it provides the ground discharge path for C1 thru R2 and second it is used as a control signal for the gated oscillator Z4 on FIG. 3b at 22. The Z1-3 output of the MAIN PULSE OSCILLATOR 30 is coupled to three other circuits including the RANGE GATE ONE-SHOT INPUT 61, the PULSE STRETCHER INPUT 71 and the DIODE BIAS CIRCUIT INPUT 46 within the DYNAMIC ATTENUATOR.

The 240 microsecond positive pulse is used to enable the 50 Khz GATED OSCILLATOR shown on FIG. 3b. The signal from the gated oscillator is a series of 12 cycles of a 50 Khz characterized schematically by waveform (b) in FIGS. 2a and 2b. where only 2 pulses of the 12 are shown. These 12 pulses are coupled to the power output transistor Q1 in FIG. 3b and become the transmitted signal to the ultra sonic transducer Y1.

A twelve cycle transmitted pulse burst was selected as a design trade-off. That is, to be wide enough to provide sufficient received energy to allow for a simple integrating type of filter in the receiver. Thus, reduce the detection of short term ambient noise.

In addition, the pulse should be narrow enough to allow for detecting a short range echo, the 12 cycle burst (in air) represents approximately at 3" propagation distance. A minimum received echo distance of less than 12" is time interval between the ultra sonic transmitted pulse and the received echo. This time is related to distance by the speed of sound in air where:

C=331.4*(T/273) m/second
C=Speed of sound in air
T=Temperature in Kelvin (K=C+273°)
M=Meters
Sec=Seconds at 25 C
C=331.4*(273+25)/273 =346.2 m/sec The 38 m sec interval sets the maximum range of the sensor to a value equivalent to the maximum time the receiver looks for a signal. This 38 m sec represents a round trip distance of:

346.2 meters/sec×0.038 sec=13.15 meters or a range distance of ½ the round trip or 6.58 meters or about 21 feet. Twenty-one (21) feet is approximately the interior dimension of a garage and is a reasonable trade off between signal strength noise, and a useful detection range.

Referring to FIG. 3b, the single transducer Y1 is used for both transmission and receiving. The electrical circuit transmission, the signal level on Y1 is about 300 v pp while during reception the received signal is only a few millivolts. During the transition from transmit to receive, the transducer will continue to ring for a short period of time marking any received signal. The ring blanking gate is basically a pulse stretcher to logically disable any received signal during the transmission and ring time of the transducer.

The transducer Y1 is an electrostatic transducer specifically designed for ultrasonic application. Although, the circuit design is not limited to any specific transducer, this circuit described here in uses an Electrostatic Transducer Part No. 604142 from: Polaroid Corporation; 575 Technology Square −3; Cambridge, Massachusetts 02139.

Referring to FIG. 3b, the TRANSDUCER DRIVE CIRCUIT 14 includes a step up transformer T1, the voltage bias circuit C10 and CR9 and clipping diodes CR2 and CR3. During transmission the 12 cycle 50 kHZ signal at Q1 is stepped up from 10 V at terminal 3 to about 300 v pp between terminals 1 and 2 of Transformer T1. Capacitor C10 and Diode CR8 provide a ½ wave rectifier bias circuit which provides the recommended 150 vdc bias for the transducer. Diodes CR9 and transmitted signal swing, as seen by the receiver to within 1 diode drop from ground.

During the receive cycle, the low level returning echoes are detected by the transducer and coupled thru capacitor C10 and transformer secondary T1 to the DIODE CLAMP in DYNAMIC ATTENUATOR 40, and to the AMP FILTER input 43.

Referring to FIG. 3a, the RANGE GATE ONE-SHOT is shown within phantom block 62. Initiated by the main pulse signal, the RANGE GATE ONE-SHOT output signal shown as waveform (f) in FIGS. 2a and 2b is a gate signal that establishes the range distance threshold of the received signal at trailing edge 234. An external potentiometer, such as R4 in FIG. 3a, provides the user with the ability to set the Range distance. The ouput of the range gate sets up two logic level time intervals—A positive (or 1) level to the left of T3 in FIGS. 2a and 2b to indicate an inside Range, and a low to the right of T3 (or 0) level to indicate an outside Range.

Timer Z2 is configured as as 1 shot multivibrator. Network C3 R3 differentiate the signal from the main pulse oscillator Z1-3 and the resultant negative pulse at the trigger input pin 2 of Z2 switches the output at pin 3 of Z2 and R5 establish the duration of the resultant positive output level. Resistor R4 is a potentiometer is located such to provide the user the ability to externally adjust the RC time and thus the duration of the positive range threshold. Resistor R5 sets the minimum range and also prevents excessive current -from the discharge transistor output pin 7 of Z2.

Referring to FIG. 3a, the RING BLANKING GATE is shown within phantom block 70 having an input 71 and output at 72. The RING BLANKING GATE is provided by the pulse stretcher circuit of Nand Gate Z7B, R13 C13 and CR13. During the positive portion of the main pulse, i.e. waveform (a) in FIGS. 2a and 2b, the main pulse signal is coupled thru CR13 to Z7 input pin 3,4,5 causing the output to go to a low or ground state as shown by waveform (d) of FIGS. 2a and 2b. The output at pin 6 will remain at the ground level until the positive input signal level returns to ground plus the additional time necessary to discharge capacitor C13 thru R13. This additional time required to discharge C13 provides the necessary time to extend the negative output signal to blank the ringing decay time of the transducer Y1 in the TRANSDUCER DRIVE CIRCUIT 14 of FIG. 3b.

Referring to FIG. 3b, phantom block 20 forms a perimeter around the 50 Khz GATED OSCILLATOR, a free running multivibrator with a frequency of 50 Khz. A ground signal is applied from Z1-pin 7 thru CR5 as each MAIN PULSE OSCILLATOR output pulse changes from a high to a low. The main pulse is the positive pulse of waveform (a) at 212 in FIGS. 2a and 2b. The positive portion of this pulse is the transmit interval for transducer Y1. Waveform (b) shows a 50 Khz drive signal during the transmit interval.

The negative portion of this pulse is the receive interval. The ground signal through CR5 via R11 prevents C12 from charging during the negative or receive portion of the main pulse time interval. Keeping Z4-2 at ground causes the output at Z4-3 to remain a positive level which in turn keeps PNP transistor Q1, the output transistor, off.

During the transmit, or positive portion of the main pulse interval, the voltage at Z4 pin 7 not clamped to ground and the Z4 multivibrator will begin to oscillate at a 50 khz rate. Resistors R11, R12 and capacitor C12 set the operating frequency and pulse duration. The output at Z4-3 is a series of negative pulses. The output at Z4-3 goes low as the voltage at Z4-6 penetrates the ⅔+V threshold. Each resistor R10 to the base of Q1. There will be about 10–12 pulses during the transmit gate each time turning Q1 on and applying a transmit current pulse to the transformer T1. Transformer T1 secondary together with capacitor C10 and the transducer Y1 equivalent capacity form a tuned circuit with a resonate frequency of 50 Khz.

Rectifier diode CR8 and capacitor C10 form a half wave rectifier circuit which provide the 150 V dc bias necessary for proper operation of the capacity transducer Y1. DIODE CLAMP CR9 and CR10 close the output circuit path and prevent signals larger than one diode drop from reaching the low level amplifier within AMP FILTER 50.

Referring to FIG. 3b, the circuitry within phantom block 40 represents the DYNAMIC ATTENUATOR. The circuit within phantom block 42 represents the DIODE BIAS CIRCUIT. Transistor Q2 and Q3 are connected as a current mirror and together with diode CR10 and transistor Q4 form the dynamic attenuator. During the transmission interval, transistor Q4 is turned on by the positive pulse from the MAIN PULSE OSCILLATOR pin Z1-3. As Q4 is driven into conduction by the main pulse, waveform (a) of FIG. 2a and 2b, current flows thru Q3, thru resistor R19 to discharge capacitor C16. CR10. At the end of the main pulse, i.e. the transmission pulse interval, transistor Q4 turns off. Transistor Q3 continues to conduct as capacitor C16 is charged thru Resistor R19. This exponential decreasing charging current is reflected to mirror transistor Q2. This decreasing current has the effect of a dynamic increase in the impedance of diode CR10 thereby eliminating the clamp load via CR10 on the input to AMP FILTER 50. The overall effect of the diode clamp via CR10 when forward biased by transistor Q2 is to attenuate the transducer ringing and the high level close return signals. As C16 charges and the bias current thru CR10 decreases, the attenuation is slowly reduced as the weaker more distant return signals are received.

Referring to FIG. 3b, the circuit phantom block 50 represents the AMP FILTER, a low level, narrow bandwidth amplifier and integrating filter detector for amplifying the electrical echo signal at its input 52 and for providing a logic level output received pulse at its output 51. As the received signal has a very wide dynamic range due to square of the distance characteristics, the dynamic attenuator uses the non linear or impedance characteristic of limit diode Ultrasonic echoes returning from the target are picked up by the transducer Y1. These signals are coupled thru capacitor C10, the transformer T1 secondary pins 1-2 to coupling capacitor C17, the amplifier input 52. The electrical echo signal is then fed to the base of Q5 for amplification by the first stage of the amplifier.

The AMP FILTER 50 circuit consisting of Q5, Q6 and Q7 together with associated circuitry is configured to provide approximately 70 db voltage gain. Capacitors C17 and C19 limit the low frequency response and provide a center frequency gain at about 50 Khz.

Variable resistor R26 is a sensitivity adjustment potentiometer. R26 sets the level of the amplified signal to the detector. Transistor Q8 is biased just below conduction by the voltage divider consisting of R31, CR11, R28 and R30. An electrical echo signal having an amplitude greater than a few hundred millivolts at input 52 drives Q8 into conduction on each negative half cycle. These pulses are integrated by capacitor C20. Resistors R32, R33 and C20 provide a simple integrating type filter. This filter requires approximately 3 to 40 successive 50 Khz pulses to build up a sufficient signal level to reach the threshold of gate Z9 and be considered a valid returning echo.

Referring to FIG. 3a, phantom block 80 partially surrounds the OUTPUT SIGNAL MEANS. Two nand gates Z7a and Z7c logically select the conditons to turn on either the red or green displays.

The Display circuit consists of two Display 1 shots and associated logic circuitry. For the parking application, the display will consist of a red and a green lamp or LED. Without any received signal, both lamps will be off. If a received signal is detected when the range signal is low, the green 1 shot will be triggered on indicating a return signal is being received but is outside the threshold limit. As the car or target approaches the sensor, the received echo will be returned in a shorter time. As the car continues toward the sensor, the received pulse will finally reach the point where the range gate is positive (inside range). At this time, the green lamp will go out and the red 1 shot triggered turning on the red lamp.

Lamp driver 1 shot circuits are used as a memory element to hold the received data information and provide a bright DC type lamp display.

The conditions for turning on the green display is any positive return occurring after the negative range blanking gate from Z7B pin 6. The resultant negative pulse from Z7c state. The same signal will discharge timing capacitor C14. In the configuration shown on the schematic timer Z5 is a resetable 1 shot multivibrator. Resistor Capacitor R15, C14 set the on time interval to about 40 m sec or slightly longer than the period of the main pulse oscillator. This timing allows the lamp to remain fully illuminated as long as a continuous series of echo returns are received but turn off at the absence of any echo.

An additional logical condition is placed on lighting the red lamp. The red lamp will be illuminated when there is a return (Z7a pin 2) the blanking gate signal is positive Z7a pin 8 and the range gate is positive Z7a pin 1. These conditions are valid only if an object is within the threshold range. The resultant negative pulse from Z7A pin 9 will trigger the red display timer Z3 shown at FIG. 3c. The output of the RED LAMP ONE-SHOT 90 at Z3-3 is connected to the transistor Q12 and to the Z6 ONE MINUTE TIMER circuit 310.

Whenever the red lamp is triggered on, Z3 pin 3 is positive and turns on transistor Q12. As Q12 is connected to the reset input Z5 pin 4, the timer output will be reset to ground the green lamp will be turned off.

Referring to FIG. 3c, phantom block 310 contains the ONE MINUTE TIMER CIRCUIT using timer Z6. The ONE MINUTE TIMER CIRCUIT turns of the lamp drivers for applications such as parking an automobile where it desirable to turn off the display lamps after the car has been parked.

If the output the red lamp driver Z3-3 is on, a positive level will be coupled to the timing network consisting of R35, C21, CR 12, R34. Capacitor C21 will begin charging thru R35 and within about 1 minute will reach the turn of threshold of pin 6. At this time, the output at pin 3 of Z6 will go to ground turning off transistor Q11. As Q11 is the return path for both the red and green lamp driver transistor the lamp will also be turned off.

The lamps will remain off until the output of Z3 goes negative. At this time, C21 will discharge thru R34 and CR12 resetting the Z6 timer and turning on transistor Q11.

I claim:

1. A RANGE CONTROL SYSTEM, positioned within a stationary housing mounted at a reference location at a distance from a target and powered from a voltage source referenced to a reference potential such as ground, to provide a signal to indicate the distance of the target from the location of said stationary housing, the RANGE CONTROL SYSTEM comprising:

a MAIN PULSE OSCILLATOR for providing a clock signal;

a TRANSMITTER RECEIVER CIRCUIT MEANS having, a stepup transformer having a primary having a first and second terminal and a secondary having a first and secondary terminal;

a blocking capacitor having a first and second terminal;

a rectifier diode having a cathode and an anode;

an electrostatic transducer having a first and second terminal;

a gated oscillator means responsive to said clock signal for providing a predetermined number of drive pulses for each clock signal to said stepup transformer primary first terminal;

said stepup transformer secondary first terminal being coupled to said blocking capacitor first terminal;

said blocking capacitor second terminal being coupled to said electrostatic transducer first terminal and to the cathode of said rectifying diode;

the anode of said rectifying diode being coupled to the second terminal of said electrostatic transducer, to said stepup transformer primary second terminal and to said reference potential, a DIODE CLAMP having a first and second terminal, said first terminal being coupled to said stepup transformer secondary second terminal, said DIODE CLAMP second terminal being coupled to said reference potential;

a DIODE BIAS CIRCUIT responsive to said clock signal for providing a predetermined time dependent unipolar decreasing bias current to said DIODE CLAMP first terminal to bias said diode clamp to provide diminishing attenuation of said electrical echo signal with increasing time; and, an AMP FILTER CIRCUIT coupled to said DIODE CLAMP first terminal for amplifying electrical echo signals at said DIODE CLAMP first terminal to provide amplified echo signals at a TRANSMITTER RECEIVER CIRCUIT MEANS amplified echo signal output terminal;

a TIMING CIRCUIT MEANS responsive to said clock signal for providing a range gate signal characterized to start with each clock signal and to have a predetermined duration characterized to provide a time for said acoustic pulse to travel to said target and for said echo to return from said target;

OUTPUT SIGNAL MEANS means responsive to the range gate signal and to said amplified echo signal for providing an alarm signal to indicate that an echo signal is received prior to the termination of said range gate signal.

2. The RANGE CONTROL SYSTEM of claim 1 wherein said transmitted acoustic pulse has unwanted tailoff ringing, said TIMING CIRCUIT MEANS further comprising:

a RING BLANKING GATE signal source responsive to said clock signal for providing a ring blanking gate signal commencing with each clock signal and having a duration longer than the tailoff of said acoustic pulse.

3. the RANGE CONTROL SYSTEM of claim 2 wherein said TRANSMITTER RECEIVER CIRCUIT MEANS further comprises:

means for focusing and directing the transmission of a beam shaped acoustical pulse signal into an area to be monitored, said acoustical pulse signal traveling from said transmitter at said reference location to said target, a part of said acoustic pulse signal being reflected by said target and received by said TRANSMITER CIRCUIT MEANS and amplified to form an electrical echo signal; and an AMP FILTER MEANS for receiving and amplifying said electrical echo signal to provide said amplified echo signal;

TIMING CIRCUIT MEANS responsive to said clock signal for providing a first detection signal in response to the measure time between said said transmitted acoustical pulse signal and said amplified echo signal being less than a first predetermined limit; and a second detection signal in response to the measured time between said transmitted acoustical pulse signal and said reflected part of said acoustical pulse signal being less than a second predetermined limit, the second predetermined time limit being a shorter interval than the first.

4. The RANGE CONTROL SYSTEM of claim 2 wherein said DIODE CLAMP further comprises:

a first and second diode, each diode having an anode and a cathode, said first diode anode being connected to sid second diode cathode and to said echo signal output terminal and said first diode cathode being coupled to said second diode anode and to said reference potential.

5. The RANGE CONTROL SYSTEM of claim 2 wherein said OUTPUT SIGNAL MEANS further comprises:

a FIRST NAND GATE having at least a first, second and third inputs coupled respectively to said range gate signal, said amplified echo signal and to said ring blanking gate signal for providing said alarm signal to indicate that an echo signal is received prior to the termination of said range gate signal.

6. The RANGE CONTROL SYSTEM of claim 5 wherein said OUTPUT SIGNAL MEANS further comprises:

RED LAMP DRIVER MEANS for lighting a first lamp having a first color in response to said alarm signal to indicate that an echo signal is received prior to the termination of said range gate signal.

7. The RANGE CONTROL SYSTEM of claim 5 wherein said OUTPUT SIGNAL MEANS responsive to said ALARM SIGNAL for providing an OUTPUT ALARM SIGNAL further comprises:

a SECOND NAND GATE having at least a first and second inputs coupled respectively to said amplified echo signal and to said ring blanking gate signal for providing an in range signal to indicate that an echo signal is received subsequent to the termination of said range gate signal.

8. The RANGE CONTROL SYSTEM of claim 7 wherein said OUTPUT SIGNAL MEANS responsive to said ALARM SIGNAL for providing an OUTPUT ALARM SIGNAL further comprises:

TIME OUT CIRCUIT MEANS coupled to receive said alarm signal at a reset input, said TIME OUT CIRCUIT MEANS having a first logic state output signal in response to the absence of said alarm signal coupled to said reset input and characterized to provide a second logic state output after a predetermined delay interval in response to the presence of said alarm signal at said reset input.

9. The RANGE CONTROL SYSTEM of claim 7 wherein said OUTPUT SIGNAL MEANS responsive to said ALARM SIGNAL for providing an OUTPUT ALARM SIGNAL further comprises:
GREEN LAMP DRIVER MEANS for lighting a second lamp having a second color in response to said in range signal to indicate that an echo signal is received subsequent to the termination of said range gate signal.

10. A RANGE CONTROL SYSTEM positioned within a stationary housing mounted at a reference location at a distance from a target and powered from a voltage source referenced to a reference potential, such as ground, to provide a signal to indicate the distance of a target from the location of said stationary housing, the RANGE CONTROL SYSTEM comprising:
a MAIN PULSE OSCILLATOR for providing a clock signal;
a TRANSMITTER RECEIVER CIRCUIT MEANS responsive to said clock signal, for driving a transducer to directionally transmit an acoustic pulse signal to the target, for receiving an echo from the target and for providing an amplified echo signal; said TRANSMITTER RECEIVER CIRCUIT MEANS having;
a TRANSDUCER DRIVE CIRCUIT responsive to said clock signal for providing a predetermined number of drive pulses to said transducer in response to each clock signal and for providing electrical echo signals at an echo signal output in response to each acoustic pulse transmission; and
an AMP FILTER CIRCUIT coupled to said TRANSDUCER DRIVE CIRCUIT echo signal output for amplifying electrical echo signals and for providing amplified echo signals in response to said electrical echo signal,
a DYNAMIC ATTENUATOR CIRCUIT coupled to said TRANSDUCER DRIVE CIRCUIT echo signal output to receive said echo signal and being responsive to said clock signal for providing predetermined decreasing attenuation to said electrical echo signals with increasing time subsequent to said clock signal, said DYNAMIC ATTENUATOR CIRCUIT having;
a DIODE CLAMP having a first and second terminal, said firt terminal being coupled to said TRANSDUCER DRIVE CIRCUIT echo signal output and said second terminal being coupled to said reference potential, such as ground; and
a DIODE BIAS CIRCUIT responsive to said clock signal for providing a predetermined time dependent unipolar decreasing bias current to said DIODE CLAMP first terminal to bias said diode clamp to provide diminishing attenuation of said electrical echo signal with increasing time,
said DIODE BIAS CIRCUIT having;
a resistor and a capacitor, each having a first and second terminal, a first and second PNP transistor, each having a collector, a base and an emitter, and
a switching means having a conduction channel having a first and second terminal, said switching means being responsive to said clock signal for driving said conduction channel from a non-conductive state into a conductive state;
said first and second PNP transistor emitters being coupled to said voltage source, said first and second PNP transistor bases being connected to each other and to the collector of said second PNP transistor and to said resistor first terminal,
said capacitor first terminal being coupled to said resistor second terminal and to said switching means conduction channel first terminal,
said capacitor second terminal being coupled to said switching means conduction channel second terminal and to said reference potential,
said first PNP transistor collector coupled to said DIODE CLAMP FIRST TERMINAL;
whereby said first and second PNP transistors form a current mirror having first and second output currents from first and second collectors, said first mirror current from said first collector biasing said DIODE CLAMP, and said second mirror current being having a maximum value immediately after the turn off of said switching means immediately after said clock signal, said second mirror current being exponentially limited by the rising voltage on said capacitor as current passes thru said resistor to charge said capacitor;
a TIMING CIRCUIT MEANS responsive to said clock signal for providing a range gate signal characterized to start with each clock signal and to have a predetermined duration characterized to provide a time for said acoustic pulse to travel to said target and for said echo to return from said target; said TIMING CIRCUIT MEANS having;
a RING BLANKING GATE signal source responsive to said clock signal for providing a ring blanking gate signal commencing with each clock signal, said ring blanking gate signal having a duration longer than the tailoff of said acoustic pulse; and,
OUTPUT SIGNAL MEANS means responsive to the range gate signal and to said amplified echo signal for providing an alarm signal to indicate that an echo signal is received prior to the termination of said range gate signal.

11. The RANGE CONTROL SYSTEM of claim 10 wherein said OUTPUT SIGNAL MEANS further comprises:
a FIRST NAND GATE having at least a first, second and third inputs coupled respectively to said range gate signal, said said amplified echo signal and to said ring blanking gate signal for providing said alarm signal to indicate that an echo signal is received prior to the termination of said range gate signal.

12. The RANGE CONTROL SYSTEM of claim 11 wherein said OUTPUT SIGNAL MEANS responsive to said ALARM SIGNAL for providing an OUTPUT ALARM SIGNAL further comprises:
a SECOND NAND GATE having at least a first and second inputs coupled respectively to said amplified echo signal and to said ring blanking gate signal for providing an in range signal to indicate that an echo signal is received subsequent to the termination of said range gate signal.

13. The RANGE CONTROL SYSTEM of claim 11 wherein said OUTPUT SIGNAL MEANS further comprises:
RED LAMP DRIVER MEANS for lighting a first lamp having a first color in response to said alarm signal to indicate that an echo signal is received prior to the termination of said range gate signal.

14. The RANGE CONTROL SYSTEM of claim 13 wherein said OUTPUT SIGNAL MEANS responsive to said ALARM SIGNAL for providing an OUTPUT ALARM SIGNAL further comprises:
GREEN LAMP DRIVER MEANS for lighting a second lamp having a second color in response to said in range signal to indicate that an echo signal is received subsequent to the termination of said range gate signal.

* * * * *